United States Patent
Bacic (10) Patent No.: US 9,435,683 B2
(45) Date of Patent: Sep. 6, 2016

(54) METHOD TO DETERMINE INERTIA IN A SHAFT SYSTEM

(71) Applicant: ROLLS-ROYCE PLC, London (GB)

(72) Inventor: Marko Bacic, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 14/871,013

(22) Filed: Sep. 30, 2015

(65) Prior Publication Data
US 2016/0116329 A1   Apr. 28, 2016

(30) Foreign Application Priority Data
Oct. 22, 2014  (GB) .................................. 1418753.8

(51) Int. Cl.
| | | |
|---|---|---|
| G01L 3/02 | (2006.01) | |
| G01H 1/00 | (2006.01) | |
| G01L 3/04 | (2006.01) | |
| G01H 13/00 | (2006.01) | |
| F02C 9/28 | (2006.01) | |
| F02C 9/56 | (2006.01) | |

(52) U.S. Cl.
CPC .............. *G01H 1/006* (2013.01); *F02C 9/28* (2013.01); *F02C 9/56* (2013.01); *G01H 13/00* (2013.01); *G01L 3/04* (2013.01); *F05D 2270/335* (2013.01)

(58) Field of Classification Search
CPC ...... F02C 9/28; F02C 9/56; F05D 2270/335; G01H 13/00; G01H 1/006; G01L 3/04
USPC ............... 73/65.01, 65.09, 862.08, 862.321
See application file for complete search history.

(56) References Cited

U.S. PATENT DOCUMENTS

| | | | |
|---|---|---|---|
| 2006/0012345 A1* | 1/2006 | Dorsey ............. | H02K 15/0006 322/59 |
| 2006/0032319 A1* | 2/2006 | Zielinski ............ | G01L 3/12 73/862.045 |
| 2008/0276614 A1* | 11/2008 | Shu ................... | F02B 39/16 60/602 |
| 2010/0310373 A1* | 12/2010 | Castell Martinez ... | F03D 17/00 416/61 |
| 2013/0312423 A1 | 11/2013 | Bacic et al. | |
| 2013/0319092 A1* | 12/2013 | Rowe .................. | F01D 21/003 73/112.01 |
| 2016/0010494 A1* | 1/2016 | Erlund ................ | G01M 15/14 60/773 |

FOREIGN PATENT DOCUMENTS

| | | |
|---|---|---|
| DE | 102009009714 A1 | 12/2010 |
| EP | 1298053 A2 | 4/2003 |
| EP | 2006651 A2 | 12/2008 |
| EP | 2273168 A2 | 1/2011 |
| GB | 2131979 A | 6/1984 |

OTHER PUBLICATIONS

Mar. 3, 2016 Search Report issued in European Patent Application No. 15187691.
Apr. 25, 2015 Search Report issued in British Patent Application No. 1418753.8.

* cited by examiner

*Primary Examiner* — Max Noori
(74) *Attorney, Agent, or Firm* — Oliff PLC (57) ABSTRACT

A method to determine inertia of components of a rotating shaft system. The shaft system includes a shaft coupling a turbine to drive the rotation and a load to be driven by the rotation. The method includes steps to: apply a feedback to a forcing input to the shaft system; measure resonant frequency of the shaft; iterate steps 1.a) and 1.b) for different feedbacks; plot resonant frequency squared against gain; and determine inverse of gradient from the plot to give inertia of the turbine. Also a method to determine shaft stiffness using the inertia of the turbine.

16 Claims, 3 Drawing Sheets

METHOD TO DETERMINE INERTIA IN A SHAFT SYSTEM

The present invention relates to a method to determine inertia of components in a shaft system. It finds particular utility for determining inertia of components in a gas turbine engine shaft system.

In a gas turbine engine it is useful to know the inertia of the components in a shaft system. These inertias can be combined with the shaft stiffness in order to calculate the shaft torque and thus the power available from the shaft.

Conventionally the inertia of the turbine and the compressor are measured in a test environment before the gas turbine engine enters service, for example powering an aircraft. Disadvantageously, the inertias change over time as components of the shaft system and of the gas turbine engine deteriorate. For example, the mass of the compressors and/or turbines may increase due to accretions of dirt and other foreign body deposits and thus the inertia of these components increase. Alternatively the mass of the compressors and/or turbines and the radius at which that mass acts may reduce due to blade tip rubbing. Thus the inertias measured in the test environment become less accurate representations of the actual inertias over time and therefore the calculations dependent on the inertias, such as shaft torque, also become less accurate.

The present invention provides a method to determine inertia of components in a shaft system that seeks to address the aforementioned problems.

Accordingly the present invention provides a method to determine inertia of components of a rotating shaft system; the shaft system comprising a shaft coupling a turbine to drive the rotation and a load to be driven by the rotation; the method comprising steps to:
 a) apply a feedback to a forcing input to the shaft system, wherein the feedback comprises a gain;
 b) measure resonant frequency of the shaft;
 c) iterate steps a) and b) for different feedbacks;
 d) plot resonant frequency squared against gain; and
 e) determine inverse of gradient from the plot to give inertia of the turbine.

The present invention also provides a method to determine inertia of components of a rotating shaft system; the shaft system comprising a shaft coupling a turbine to drive the rotation and a load to be driven by the rotation; the method comprising steps to:
 f) apply a feedback to a forcing input to the shaft system;
 g) measure resonant frequency of the shaft;
 h) iterate steps a) and b) for different feedbacks;
 i) plot resonant frequency squared against gain; and
 j) determine inverse of gradient from the plot to give inertia of the compressor.

Advantageously the method of the present invention is performed during steady state running conditions of the rotating shaft system when transient conditions do not affect the method. Advantageously the method enables deterioration of the inertia of the turbine to be tracked over time so that maintenance can be scheduled appropriately. Advantageously the inertia of the turbine determined by this method can be used to more accurately control an engine associated with the rotating shaft system.

The load may comprise a fan. Alternatively the load may comprise a compressor. Alternatively the load may comprise a propeller.

The forcing input may comprise perturbed fuel flow. The forcing input may comprise a steady state component which may be steady state fuel flow demand. The forcing input may comprise a perturbation component which may be in the form of a sinusoid, a sum of sinusoids, a pseudo-random binary sequence or some other suitable form.

The feedback may comprise a small variation in fuel flow. This is additional to the perturbation component of the forcing input. Alternatively the feedback may comprise a movement of variable stator vanes to change the pressure at the exit of the load. Alternatively the feedback may comprise a movement of variable nozzle guide vanes. Alternatively the feedback may comprise a movement of variable bleed valves to change the load capacity. Alternatively the feedback may comprise a movement of a variable area nozzle.

The feedback is applied in a feedback loop and comprises a small variation to the forcing input, which itself includes a small perturbation component as well as the steady state component.

The present invention also provides a method to determine shaft stiffness in a steady state running condition; the method comprising steps to:
 a) determine inertia of the turbine according to the described method;
 b) identify a local minimum frequency and square it;
 c) determine resonant frequency of the shaft and square it;
 d) determine frequency difference by subtracting the square of the local minimum frequency from the square of the resonant frequency; and
 e) determine shaft stiffness by multiplying the inertia of the turbine by the frequency difference.

Advantageously the method determines shaft stiffness using a current determination of the turbine inertia instead of relying on a single measurement or calculation of the inertia when the shaft system is first used.

The present invention also provides a method to determine shaft stiffness at an initialisation condition; the method comprising steps to:
 a) determine shaft stiffness in the stead state running condition preceding initialisation as described above;
 b) determine resonant frequency in the steady state running condition preceding initialisation;
 c) determine resonant frequency in the initialisation condition;
 d) determine the ratio of resonant frequencies by dividing the square of the initialisation resonant frequency by the square of the steady state resonant frequency; and
 e) multiply the ratio of resonant frequencies by the steady state shaft stiffness to give the initialisation shaft stiffness.

Advantageously the shaft stiffness in a transient initialisation condition can be determined based on the shaft stiffness in a previous steady state condition. The steady state condition may immediately precede the initialisation condition or there may be intermediate steady state, initialisation and/or other transient conditions between the preceding steady state condition and the initialisation condition for which the shaft stiffness is required.

The present invention also provides a method to determine shaft torque comprising steps to:
 a) determine shaft stiffness as described above;
 b) measure shaft twist angle; and
 c) multiply together the shaft stiffness and shaft twist angle to give shaft torque.

Advantageously the shaft torque determined by this method is more accurate because it is derived using a more accurate determination of the turbine inertia ad thus the shaft stiffness.

The present invention also provides a method to control a gas turbine engine comprising steps to:
a) determine shaft torque as described above;
b) determine actual shaft power by multiplying together shaft torque and rotation speed of the shaft;
c) compare actual shaft power to demanded engine power to give a comparison value; and
d) change fuel flow to the gas turbine engine if the comparison value is non-zero.

Advantageously the method to control the gas turbine engine is more efficient because it is based on accurate determinations of the turbine inertia and thus the shaft torque.

The fuel flow may be increased if the comparison value is less than zero or may be decreased if the comparison value is greater than zero. Alternatively the fuel flow may be decreased if the comparison value is less than zero or may be increased if the comparison value is greater than zero.

The present invention also provides a controller comprising any of the methods described above. The present invention also provides a gas turbine engine comprising any of the methods described above. The present invention also provides a gas turbine engine comprising a controller as described above.

The rotating shaft system may be part of a gas turbine engine. The shaft may be a low pressure shaft. Alternatively the shaft may be an intermediate pressure shaft. Alternatively the shaft may be a high pressure shaft.

The present invention also provides a computer readable medium having a computer program recorded thereon. The computer program may be adapted to make the computer execute any of the methods described above. The present invention also provides a computer program having instructions adapted to carry out any of the methods described above. The present invention also provides a computer program comprising the computer readable medium.

Any combination of the optional features is encompassed within the scope of the invention except where mutually exclusive.

The present invention will be more fully described by way of example with reference to the accompanying drawings, in which.

Figure 1:
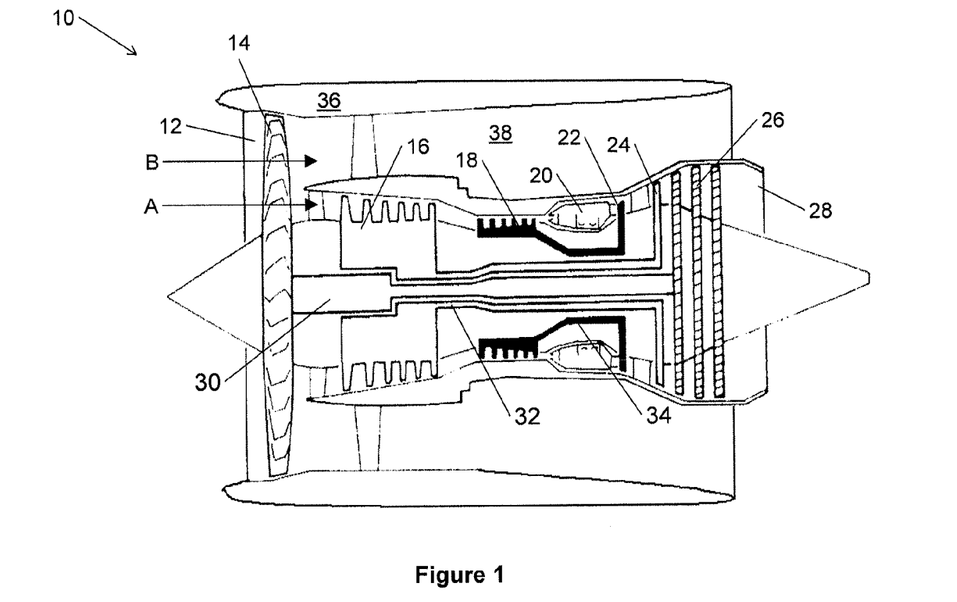
FIG. 1 is a sectional side view of a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A low pressure shaft 30 couples the low pressure turbine 26 to the fan 14. An intermediate pressure shaft 32 couples the intermediate pressure turbine 24 to the intermediate pressure compressor 16. A high pressure shaft 34 couples the high pressure turbine 22 to the high pressure compressor 18. A nacelle 36 surrounds the gas turbine engine 10 and defines, in axial flow B, a bypass duct 38.

In use, air is drawn into the air intake 12 and is accelerated by the fan 14. It is split into the two axial flows A, B. In a high bypass ratio gas turbine engine 10, the majority of the air is passed through the bypass duct 38 to be expelled to give propulsive thrust. The remainder of the air is passed into the core engine (axial flow A) where it is compressed and accelerated by the intermediate pressure compressor 16 and then the high pressure compressor 18. Fuel is injected into the combustor 20 and combusted with the air from the high pressure compressor 18. Hot combustion gases are expelled from the combustor 20. The gases are expanded and slowed through the high pressure turbine 22, intermediate pressure turbine 24 and finally through the low pressure turbine 26 before being expelled through the exhaust nozzle 28 to provide a small amount of the propulsive thrust.

Thus the flow of hot combustion gases through the turbines 22, 24, 26 causes them to rotate. The shafts 30, 32, 34 that couple the turbines 22, 24, 26 to the compressors 16, 18 and fan 14 drive their rotation. Thus the low pressure turbine 26 drives the fan 14, the intermediate pressure turbine 24 drives the intermediate pressure compressor 16 and the high pressure turbine 22 drives the high pressure compressor 18.

The method of the present invention will be described with respect to the intermediate pressure shaft 32. However, it may also be applied with felicity to the low pressure shaft 30 or to the high pressure shaft 34. The same explanation applies, mutatis mutandis, except where specifically indicated herein.

Figure 2:
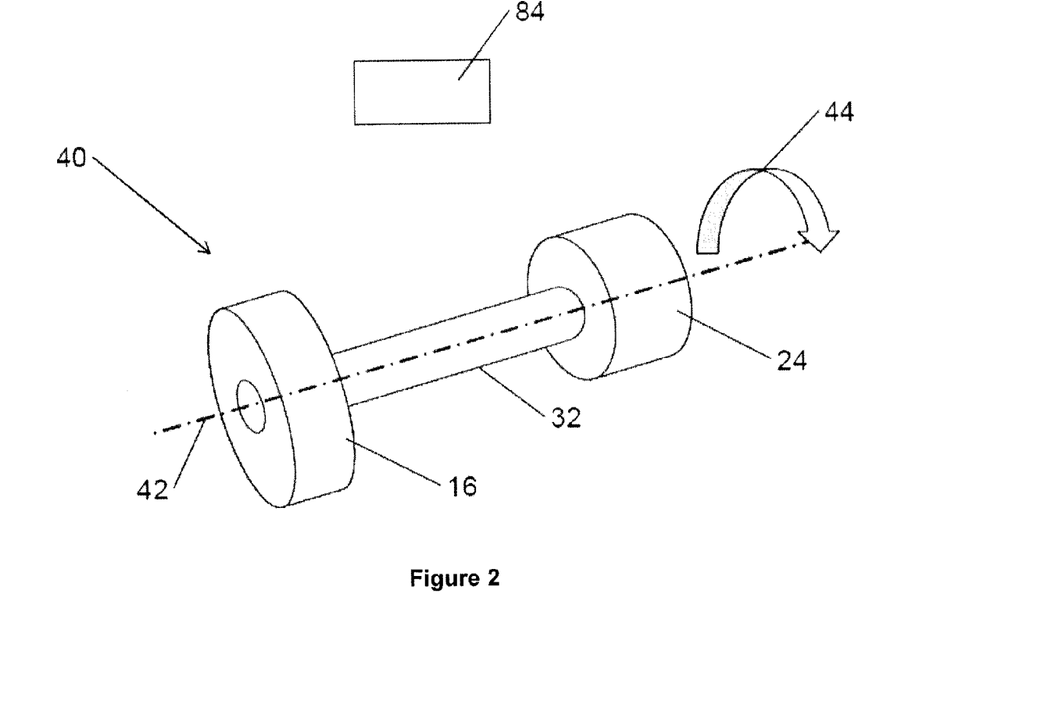
FIG. 2 is a schematic perspective view of a shaft system.

A shaft system 40 is shown in FIG. 2. The shaft system 40 comprises, for example, the low pressure shaft 30, fan 14 and low pressure turbine 26. The shaft system 40 is symmetrical about its rotational axis 42 and rotates in the direction shown by the arrows 44. The shaft system 40 rotates at rotational speed N.

Figure 3:
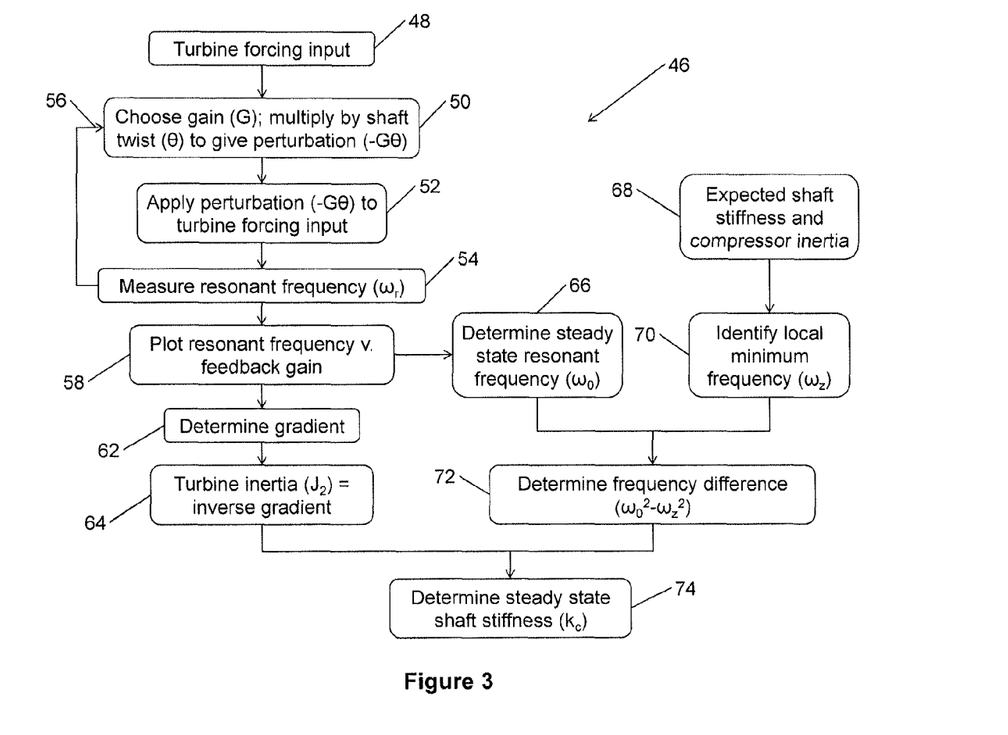
FIG. 3 is a flow chart showing steps of the method of the present invention.

Steps of the method 46 to determine inertia of components of the shaft system 40 are shown in FIG. 3. In a first step 48 a forcing input to the low pressure turbine 26 is defined. The forcing input is, for example, fuel flow supplied to the gas turbine engine 10 which is combusted in the combustor 20 and expelled as hot combustion gases through the turbine stages 22, 24, 26 to drive their rotation. Thus there is a direct relationship between the amount of fuel flow into the engine 10 and the torque generated by the low pressure turbine 26. At steady state engine running conditions there is also a direct relationship between the amount of fuel flow into the engine 10 and the rotational speed of the low pressure turbine 26. The forcing input is comprised of a steady state fuel flow demand and a perturbation. The perturbation element of the forcing input may be a narrow or broad band signal about a frequency of interest. It may be in the form of a sinusoid, a sum of sinusoids, a pseudo-random binary sequence (PRBS) or any other suitable form.

In a second step 50 of the method 46 a small gain G is chosen which is multiplied by the shaft twist $\theta$ to give a feedback $-G\theta$. The gain G is a constant which may be positive or negative, and may be non-integer. Thus the gain G is used to provide a small feedback $-G\theta$ to the forcing input, fuel flow. At step 52 the feedback $-G\theta$ is applied in a feedback loop in order to increase the fuel flow beyond that demanded by the engine running. The shaft system 40 is allowed to settle so that transient vibration effects of the feedback are eroded away. For example, the shaft system 40 may be allowed to settle for 30 seconds to allow transient effects to die away. Then at step 54 the resonant frequency $\omega_r$ of the shaft 32 is measured by any method known to the skilled reader. For example the speed N of the fan 14 may be measured and a fast Fourier transform performed on it to find the peak which is the resonant frequency $\omega_r$. Alternatively the fast Fourier transform of the compressor speed can be divided by the fast Fourier transform of the fuel flow perturbation input to give the resonant frequency $\omega_r$.

Alternatively the feedback $-G\theta$ may be a change to the pressure at the exit of the fan 14. Alternatively the feedback $-G\theta$ may be movement of the nozzle guide vanes, normally static vanes upstream of the low pressure turbine 26, to change the capacity of the low pressure turbine 26.

Iteration loop 56 returns the method 46 to the step 50 where a new gain G is chosen and is converted to a feedback $-G\theta$. The new feedback $-G\theta$ is applied to the turbine forcing input, fuel flow, at step 52 and the system 40 given time for the transient effects to settle out. Then the new resonant frequency $\omega_r$ is measured at step 54. The iteration loop 56 is followed at least twice to obtain at least three pairs of gains G and their consequent resonant frequencies $\omega_r$.

Figure 4:
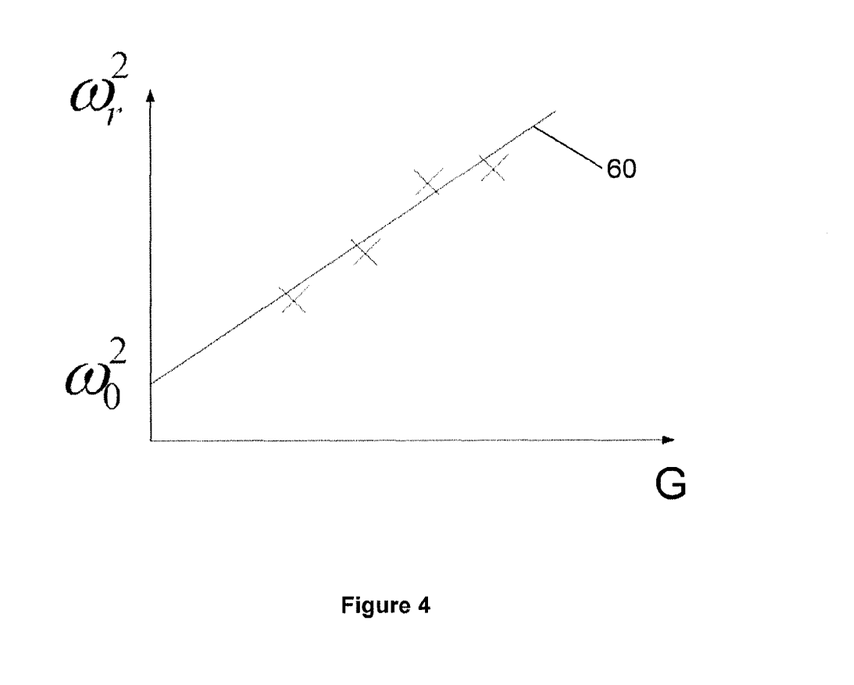
FIG. 4 is a plot of resonant frequency against gain used in the method according to the present invention.

At step 58 the pairs of gains G and the squared resonant frequencies $\omega_r$ are plotted. An exemplary plot is shown at FIG. 4, in which each pair is plotted as a cross. The resonant frequencies $\omega_r$ are squared as the points therefore lie approximately on a straight line. A best fit line 60 is determined and plotted through the crosses. For example, a least squares fit may be applied to the crosses to determine the best fit line 60 or a different method for determining the best fit line 60 through a set of points which are linearly distributed can be used.

At step 62 of the method 46, FIG. 3, the gradient of the best fit line 60 is calculated. At step 64 the gradient is inverted and set as the turbine inertia $J_2$. Thus the turbine inertia $J_2$ is equal to one divided by the gradient of the best fit line 60.

Advantageously the turbine inertia $J_2$ is derived by performing the method 46 in a steady state running condition of the shaft system 40. Where the shaft system 40 is in a gas turbine engine 10 that powers an aircraft, the steady state running condition may be cruise. Advantageously the aircraft is in cruise for a significant period during a flight and therefore there is sufficient time to operate iteration loop 56 multiple times with settling time between applying the feedback $-G\theta$ to perturb the fuel flow and measuring the resonant frequency $\omega_r$.

The change of inertia in the turbine $J_2$, through accretion or erosion of mass, occurs over an extended period of use of the low pressure turbine 26. Thus it is not necessary to perform the method 46 every time the engine 10 is in a cruise phase or even every flight. Instead the method 46 may be performed once every few cruise phases or flights with the previous value of turbine inertia $J_2$ retained and used in between performance of the method 46. For example, the method 46 may be performed with a periodicity of ten to one hundred cruises or flights. The method 46 need not be performed at regular intervals; thus ten cruises may elapse between the method 46 being performed and then twenty cruises may elapse before the method 46 is performed again. Advantageously, if the engine 10 is unexpected commanded out of the steady state cruise condition whilst the method 46 is being performed, the previous value of turbine inertia $J_2$ may be retained and the method 46 scheduled for performance in the next cruise phase without serious consequences.

The turbine inertia $J_2$ determined according to the method 46 can be used for various purposes. Firstly the turbine inertia $J_2$ can be used to track deterioration of the low pressure turbine 26 over time. Secondly the turbine inertia $J_2$ can be used in a method to determine shaft stiffness k as will be described below. The shaft stiffness k can then be used to determine shaft torque $\tau$ which can be used as a control parameter for the gas turbine engine 10. The steady state shaft stiffness k can be used to determine the shaft stiffness k at take-off of an aircraft powered by the gas turbine engine 10. Each of these uses will be described.

A method to determine shaft stiffness k in a steady state running condition of the shaft system 40, such as aircraft cruise, is also shown in FIG. 3. At step 66 the resonant frequency at steady state $\omega_0$ is determined. This is the resonant frequency $\omega_r$ of the shaft system 40 without any feedback $-G\theta$ applied to the forcing input, fuel flow. Thus the square of the steady state resonant frequency $\omega_0$ is the point on the y-axis of FIG. 4 where the gain G is zero. Alternatively the steady state resonant frequency $\omega_0$ can be determined by one of the two methods described below.

Figure 5:
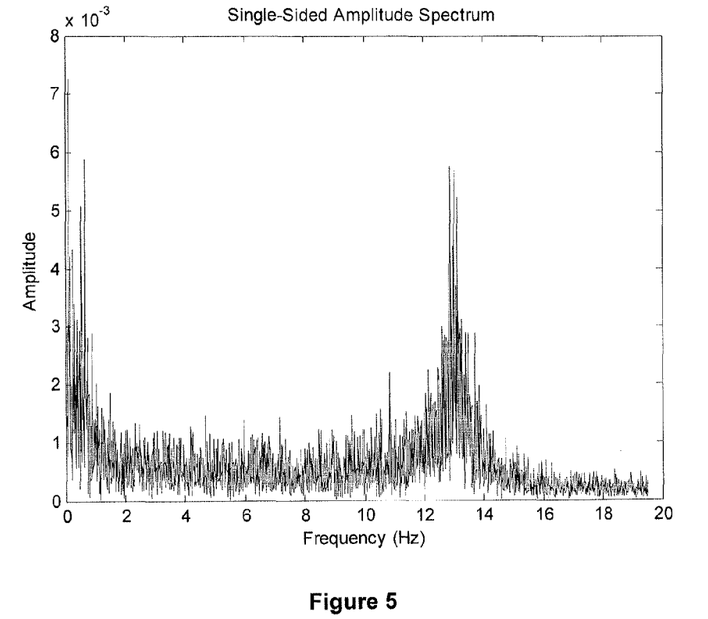
FIG. 5 is a graph of amplitude plotted against frequency.

A first method of determining the steady state resonant frequency $\omega_0$ comprises three steps. In the first step the rotational speed N of the low pressure shaft 30 is measured, for example using a known speed probe or phonic wheel mounted anywhere along the low pressure shaft 30. As will be apparent to the skilled reader, it is beneficial to position the speed probes or phonic wheels away from points on the low pressure shaft 30 that are nodes of oscillation, that is where the amplitude of oscillation is approximately zero. In a second step a fast Fourier transform is applied to the measured rotational speed N in order to generate a spectrum of the frequency response. An example of such a frequency response is shown in FIG. 5. The peak frequency, at around 13 Hz as drawn, corresponds to steady state resonant frequency $\omega_0$. The spread of the peak is due to the damping of the steady state resonant frequency $\omega_0$. Thus more damping results in a broader, lower peak. Advantageously the spread of the frequency peak may be used as a quality measure so that if the peak is too spread it is determined that there is too much damping to give an accurate indication of the steady state resonant frequency $\omega_0$.

The steady state resonant frequency $\omega_0$ may be in the range of 10 Hz to 100 Hz. For a three-shaft gas turbine engine 10, the intermediate pressure shaft 32 may have a steady state resonant frequency $\omega_0$ in the range 30 Hz to 60 Hz. The low pressure shaft 30 may have a steady state resonant frequency $\omega_0$ with a lower frequency, for example less than 30 Hz, because it is longer and inherently less stiff. The high pressure shaft 34 may have a steady state resonant frequency $\omega_0$ with a higher frequency, for example greater than 60 Hz because it is short and stiff.

A second method of determining the steady state resonant frequency $\omega_0$ comprises a first step of providing a phonic wheel at each end of the low pressure shaft 30 and a second step of measuring the time of arrival of each tooth of each phonic wheel. A third step of the method comprises cross-correlating the time of arrival measurements from the fan 14 end of the low pressure shaft 30 with the time of arrival measurements from the low pressure turbine 26 end of the low pressure shaft 30. The cross-correlation should be repeated with different imposed time delays between the two sets of measurements. In a fourth step of the method the cross-correlations should be plotted against the time delay imposed. In a fifth step of the method a quadratic is fitted to the plot against time and its peak is found. The peak of a quadratic is where the gradient is zero. The peak corresponds to the steady state resonant frequency $\omega_0$.

Thus the steady state resonant frequency $\omega_0$ can be determined or derived, using either of the described methods, from measurements of the rotational speed N of the low pressure shaft 30 at one or two locations along its length.

At step 68 of FIG. 3 the expected shaft stiffness $k_{est}$ and compressor inertia $J_{1\_est}$ of the shaft system 40 are determined. These may be calculated from design conditions or be measured in test conditions. At step 70 the shaft frequency spectrum $H(\omega)$ around the expected shaft stiffness $k_{est}$ and compressor inertia $J_{1\_est}$ is investigated, for example using a narrow band fast Fourier transform, in order to identify the local minimum frequency $\omega_z$. This local minimum frequency $\omega_z$ is sometimes referred to as the notch frequency. Mathematically the local minimum frequency $\omega_z$ is equal to the square root of shaft stiffness k divided by the compressor inertia $J_1$. Since the shaft system 40 will not precisely conform to design conditions, or will have deteriorated relative to the test conditions, the local minimum frequency $\omega_z$ will not perfectly coincide with the mathematical frequency calculated from the expected shaft stiffness $k_{est}$ and compressor inertia $J_{1\_est}$.

Steps 68 and 70 to identify the local minimum frequency $\omega_z$ may be performed before, after or in parallel with the step 66 to determine the steady state resonant frequency $\omega_0$. At step 72 the frequency difference is determined. First the steady state resonant frequency $\omega_0$ from step 66 is squared and the local minimum frequency $\omega_z$ from step 70 is also squared. The frequencies can be squared in either order or simultaneously. Then the frequency difference is calculated by subtracting the square of the local minimum frequency $\omega_z$ from the square of the steady state resonant frequency $\omega_0$.

At step 74 the steady state shaft stiffness $k_c$ is determined. The steady state shaft stiffness $k_c$ is the product of the turbine inertia $J_2$, from step 64, and the frequency difference, from step 72. Mathematically, $k_c = J_2(\omega_0^2 - \omega_z^2)$. The shaft stiffness k is dependent on temperature, among other factors. Thus the steady state shaft stiffness $k_c$ calculated according to this method 46 is a good determination because the temperature of the shaft system 40 does not change during the aircraft cruise, or other steady state, conditions.

It is beneficial to determine the shaft stiffness k at an initialisation condition of the shaft system 40, for example at take-off of the aircraft powered by the gas turbine engine 10 in which the shaft system 40 functions. Whilst the equivalent determination of initialisation shaft stiffness $k_t$ can theoretically be made as the determination at step 74 of the method 46, it is difficult to determine the steady state resonant frequency $\omega_0$ because the initialisation, take-off, is transient. However, the initialisation shaft stiffness $k_t$ can be determined using a ratio from the steady state shaft stiffness $k_c$.

Thus a method to determine the initialisation shaft stiffness $k_t$, for example at take-off, comprises first determining the steady state shaft stiffness $k_c$ according to the method 46 described above for a steady state running condition preceding the current initialisation. For example the steady state shaft stiffness $k_c$ may be determined for a cruise in one flight and then the initialisation shaft stiffness $k_t$ be determined therefrom for the next take-off of the aircraft. Alternatively the steady state shaft stiffness $k_c$ may be used for several successive take-offs because the turbine inertia $J_2$ from which it is derived does not deteriorate rapidly so it is not necessary to recalculate the steady state shaft stiffness $k_c$ during every cruise before it is used to determine the initialisation shaft stiffness $k_t$.

The method to determine the initialisation shaft stiffness $k_t$ also comprises determining the steady state resonant frequency $\omega_0$ as described at step 66 of method 46 described above, for the same steady state running condition preceding the current initialisation.

The next step comprises measuring the resonant frequency $\omega_r$ of the shaft system 40 in the initialisation condition. This may be performed in the same manner as step 54 in the steady state running condition but the resonant frequency $\omega_r$ is only measured once and so there is no feedback $-G\theta$ of the turbine forcing input, perturbed fuel flow, required.

In the next step the ratio of squared resonant frequencies is determined. First the resonant frequency $\omega_r$ in the initialisation condition is squared. Then the squared resonant frequency $\omega_r$ is divided by the square of the steady state resonant frequency $\omega_0$. This provides the ratio between the squared resonant frequencies $\omega_r^2$, $\omega_0^2$ and also between the shaft stiffnesses $k_t$, $k_c$ because the local minimum frequency $\omega_z$ and turbine inertia $J_2$ are unchanged by the difference between conditions at steady state running and the subsequent initialisation. Hence the initialisation shaft stiffness $k_t$ is determined by multiplying the ratio of resonant frequencies by the steady state shaft stiffness $k_c$. Mathematically, $$k_t = k_c \frac{\omega_r^2}{\omega_0^2}.$$

The steady state shaft stiffness $k_c$ and/or the initialisation shaft stiffness $k_t$ can be used in a method to determine shaft torque τ. First the shaft stiffness k is determined as described above. Before, in parallel with, or after determination of the shaft stiffness k, the twist angle θ of the shaft is measured. The twist angle θ is the amount by which the two ends of the low pressure shaft 30 are circumferentially misaligned whilst rotating, compared to their alignment when stationary. The twist angle θ is measured in radians and may be dependent on the temperature of the shaft system 40, the driving load applied by the low pressure turbine 26, and the material from which the low pressure shaft 30 is formed.

Finally the shaft torque τ is determined by multiplying together the shaft stiffness k and the shaft twist angle θ. Shaft torque T is a measure of the power available from the low pressure shaft 30. Thus shaft torque T can be used in a method to control a gas turbine engine 10.

A method to control a gas turbine engine 10 may comprise a first step of determining shaft torque τ as described above. The shaft torque T may be determined for an initialisation condition, such as take-off, by using the initialisation shaft stiffness $k_t$. Alternatively the shaft torque T may be determined for a steady state running condition, such as cruise, by using the steady state shaft stiffness $k_c$.

In a second step of the method actual power of the low pressure shaft 30 is determined. It is calculated by multiplying together the shaft torque T from the first step and the rotational speed N of the low pressure shaft 30. The rotational speed N may be measured by, for example, a phonic wheel or other rotary speed sensor.

The actual shaft power can be compared to the demanded shaft power. The demanded shaft power may be expressed as a known percentage of demanded engine power where there is a known relationship between the power generated by the whole engine 10 and the power generated by one of the shafts 30, 32, 34 within the gas turbine engine 10. The comparison may result in a comparison value which will be non-zero except where the actual shaft power exactly matches the demanded shaft power. Specifically the comparison value may be generated as the demanded shaft power minus the actual shaft power.

The gas turbine engine 10 may controlled by changing fuel flow to the engine 10 on the basis of the value of the comparison value. For example, if the comparison value is less than zero the fuel flow to the engine 10 may be increased to increase the rotational speed N of the low pressure shaft 30 and thus the available shaft power. In consequence the engine thrust will increase. If the comparison value is greater than zero the fuel flow to the engine 10 may be reduced to decrease the rotational speed N of the low pressure shaft 30 and thus the available shaft power. In consequence the engine thrust will also decrease.

The method of controlling the gas turbine engine 10 using shaft torque T offers a particularly effective control parameter where the fan 14 is a variable pitch fan. A variable pitch fan is one where the angle of the rotating blades to the incident air flow can be changed. Similarly where the method of controlling the gas turbine engine 10 is applied to the intermediate pressure shaft system, using shaft torque τ is a particularly effective control parameter where the intermediate pressure compressor 16 is a variable pitch compressor.

The method of controlling the gas turbine engine 10 may be used in development programmes as a parallel control method. For example, the method as described herein may be used to control the gas turbine engine 10 but a conventional control method based on shaft speed or a pressure ratio may be available to control the gas turbine engine 10 if unexpected flight scenarios occur. The control method can therefore be directly compared against current control methods in order to identify the improvements in gas turbine engine 10 performance, reduction in exhaust temperatures and other benefits of the described method. Running the described control method in parallel with known control methods also provides the option of switching control method dependent on prevailing conditions, such as flight phase, so that the most efficient method of control is used at any given time.

Advantageously the shaft torque τ, based on shaft stiffness k, can therefore be used to improve control of the gas turbine engine 10. By more accurately determining the initialisation shaft stiffness $k_t$ the operating temperature of the gas turbine engine 10 at take-off may be reduced by up to 5K. This has consequent benefits for component life, engine efficiency as less cooling air must be extracted from the working gas, and fuel burn. More accurate determination of the steady state shaft stiffness $k_c$ may be used to better control the engine thrust during aircraft cruise with a consequent improvement in fuel burn, measured as an improvement in specific fuel capacity.

Where the shaft torque T is determined in accordance with the method of the present invention there is no requirement for shaft torque measurement probes or telemetry to transmit the measurements to a controller. Advantageously this reduces the part count and weight of the gas turbine engine 10 without compromising accuracy of the measurements.

Figure 6:
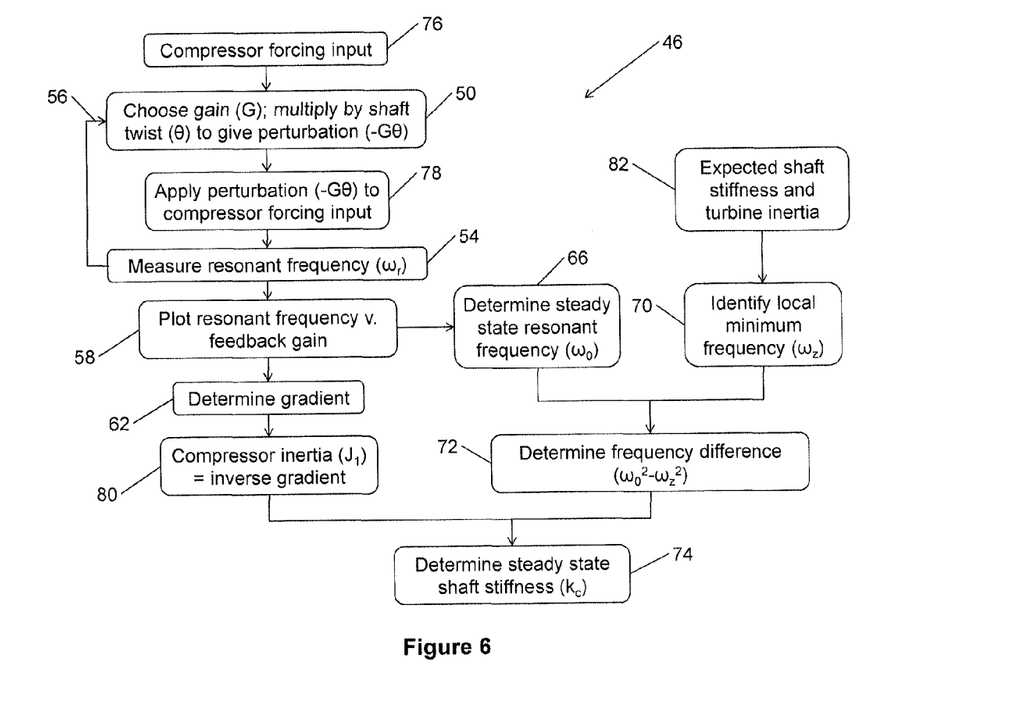
FIG. 6 is a flow chart showing steps of the method of the present invention.

FIG. 6 is a flow chart showing a variant to the method 46, and is similar to FIG. 3. The method 46 is described with respect to the intermediate pressure shaft system. In step 76 a forcing input to the intermediate pressure compressor 16 is defined. The forcing input is, for example, the mass flow of air through the intermediate pressure compressor 16 caused by the rotation of the intermediate pressure shaft 32 driven by the intermediate pressure turbine 24. The forcing input is comprised of a steady state fuel flow demand and a perturbation. The perturbation element of the forcing input may be a narrow or broad band signal about a frequency of interest. It may be in the form of a sinusoid, a sum of sinusoids, a pseudo-random binary sequence (PRBS) or any other suitable form. Step 76 replaces the turbine forcing input step 48 in FIG. 3.

In step 50 a small feedback gain G is identified and multiplied by the shaft twist 8 to give a feedback −Gθ. Where the compressor forcing input is airflow through the intermediate pressure compressor 16 the feedback −Gθ may be the position of variable geometry, such as stator vanes, which affects the incidence of air into the intermediate pressure compressor 16. Alternatively the feedback −Gθ may be movement of variable bleed valves or a variable area nozzle each of which acts to change the operating point of the intermediate pressure compressor 16. At step 78 the feedback −Gθ is applied to the compressor forcing input. Step 78 replaces applying the feedback −Gθ to the turbine forcing input, step 52. At step 54 the resonant frequency $\omega_r$ of the intermediate pressure shaft 32 is measured. This may be achieved by measuring the rotational speed N of the intermediate pressure turbine 24 and processing as previously described.

Iteration loop 56 is followed at least twice to choose a different feedback −Gθ (step 50) and apply it to the compressor forcing input (step 78) and measure the resultant resonant frequency $\omega_r$. Thus at least three pairs of feedback −Gθ and resultant resonant frequency $\omega_r$ are obtained. At step 58 pairs of gains G and the square of the resultant resonant frequencies $\omega_r$ are plotted as shown in FIG. 4 and a best fit line 60 drawn through them.

At step 62 the gradient of the best fit line 60 is determined. At step 80 the compressor inertia $J_1$ is determined by inverting the gradient of the best fit line 60. Thus the compressor inertia $J_1$ is equal to one divided by the gradient of the best fit line 60. Step 80 replaces step 64 in which the turbine inertia $J_2$ was determined.

As also shown in FIG. 6, the method 46 may include further steps to determine the steady state shaft stiffness $k_c$. The steady state resonant frequency $\omega_0$ of the shaft 32 is determined at step 66 using the plot generated at step 58. Thus the square of the steady state resonant frequency $\omega_0$ is the squared resonant frequency $\omega_r^2$ where the gain G is zero, where the best fit line 60 crosses the y-axis.

At step 82 the expected shaft stiffness $k_{est}$ and expected turbine inertia $J_{2\_est}$ are determined, for example from design or test measurements. At step 70 the local minimum frequency $\omega_z$ is identified by investigating the frequency spectrum H(ω) around the expected shaft stiffness $k_{est}$ and turbine inertia $J_{2\_est}$, for example by applying a narrow band fast Fourier transform. This local minimum frequency $\omega_z$ is sometimes referred to as the notch frequency. Mathematically the local minimum frequency $\omega_z$ is equal to the square root of shaft stiffness k divided by the turbine inertia $J_2$. Since the shaft system 40 will not precisely conform to design conditions, or will have deteriorated relative to the test conditions, the local minimum frequency $\omega_z$ will not perfectly coincide with the mathematical frequency calculated from the expected shaft stiffness $k_{est}$ and turbine inertia $J_{2\_est}$.

Steps 82 and 70 to identify the local minimum frequency $\omega_z$ may be performed before, after or in parallel with the step 66 to determine the steady state resonant frequency $\omega_0$. At step 72 the frequency difference is determined. First the steady state resonant frequency $\omega_0$ from step 66 is squared and the local minimum frequency $\omega_z$ from step 70 is also squared. The frequencies can be squared in either order or simultaneously. Then the frequency difference is calculated by subtracting the square of the local minimum frequency $\omega_z$ from the square of the steady state resonant frequency $\omega_0$.

At step 74 the steady state shaft stiffness $k_c$ is determined. The shaft stiffness $k_c$ is the product of the compressor inertia $J_1$, from step 64, and the frequency difference, from step 72.

Mathematically, $k_c = J_1(\omega_0^2 - \omega_z^2)$. The shaft stiffness k is dependent on temperature, among other factors. Thus the steady state shaft stiffness $k_c$ calculated according to this method 46 is a good determination because the temperature of the shaft system 40 does not change during the aircraft cruise, or other steady state, conditions.

The steps of the methods may advantageously be performed by a controller 84 as shown in FIG. 2. The controller 84 may be a function of the engine electronic controller (EEC) or may be functionally coupled thereto. This is particularly advantageous where the shaft torque τ determined according to the method is used to control the gas turbine engine 10. The controller 84 may perform control functions, monitoring functions or a combination of both.

The method 46 of determining inertia J of a component of the rotating shaft system 40 has been described to include steps to apply a feedback –Gθ to a forcing input, perturbed fuel flow, of the low pressure turbine 26 or fan 14. Thus more generally the method 46 comprises applying a feedback –Gθ to a forcing input of the shaft system 40 to change the torque T of one or more of the components. The forcing input may first act on the low pressure turbine 26, for example where the forcing input is fuel flow and the feedback –Gθ is a change in the amount of fuel supplied to the combustor 20 or where the forcing input is a change in the pressure at the exit of the low pressure turbine 26 and the feedback –Gθ is movement of variable geometry such as the nozzle guide vanes. Alternatively in an intermediate pressure shaft system the forcing input may first act on the intermediate pressure compressor 16, for example where the forcing input is the mass flow of air into the core of the gas turbine engine 10 and the feedback –Gθ is the position of the variable stator vanes that changes the quantity and incident angle of airflow into the compressor 16 or the feedback –Gθ is the movement of variable bleed valves or a variable area nozzle which affects the capacity of the intermediate pressure compressor 16.

The method of determining inertia J according to the present invention is preferably encompassed in computer-implemented code and stored on a computer-readable medium. It is thus a computer-implemented method of determining inertia J of components in a rotating shaft system. The method may be implemented on a basic computer system comprising a processing unit, memory, user interface means such as a keyboard and/or mouse, and display means. The method may be performed 'offline' on data which has been measured and recorded previously. This has advantages when analysing data for development work of improvements to the shaft system 40 and/or gas turbine engine 10. Alternatively it may be performed in 'real-time', that is at the same time that the data is measured. In this case the computer may be coupled to the shaft system 40 and/or gas turbine engine 10. Where the system forms part of a gas turbine engine 10 the computer may be an electronic engine controller or another on-board processor. Where the gas turbine engine 10 powers an aircraft, the computer may be an engine controller, a processor on-board the engine 10 or a processor on-board the aircraft. Thus the gas turbine engine 10 comprises the controller 84 which implements the method or, more generally, the gas turbine engine 10 comprises the method.

Although the methods of the present invention have been described with respect to the shaft system 40 comprising the fan 14, low pressure shaft 30 and low pressure turbine 26 they find equal utility when applied to the intermediate pressure shaft system or high pressure shaft system. The intermediate shaft system comprises the intermediate pressure compressor 16, intermediate pressure shaft 32 and intermediate pressure turbine 24. The high pressure shaft system comprises the high pressure compressor 18, high pressure shaft 34 and high pressure turbine 22.

The method has been described in relation to a shaft system 40 of a gas turbine engine 10. However, it also finds felicity in shaft systems in other applications, for example drive trains for compressors in oil and gas pumping pipelines and for ship propellers. The method is also applicable where the driven load is an electrical generator.

The method has been described in relation to a shaft system 40 in a gas turbine engine 10 arranged to power an aircraft. However, it can also be used for a shaft system 40 in a gas turbine engine 10 for use in a marine or industrial application.

The invention claimed is:

1. A method to determine inertia of components of a rotating shaft system; the shaft system comprising a shaft coupling a turbine to drive the rotation and a load to be driven by the rotation; the method comprising steps to:
   a) apply a feedback to a forcing input to the shaft system, wherein the feedback comprises a gain;
   b) measure resonant frequency of the shaft;
   c) iterate steps a and b for different feedbacks;
   d) plot resonant frequency squared against gain; and
   e) determine inverse of gradient from the plot to give inertia of the turbine.

2. A method as claimed in claim 1 wherein the load comprises a fan;
   a compressor; or a propeller.

3. A method as claimed in claim 1 wherein the forcing input comprises perturbed fuel flow.

4. A method as claimed in claim 1 wherein the feedback comprises a small variation in fuel flow; a movement of variable stator vanes to change the pressure at the exit of the load; a movement of variable nozzle guide vanes; a movement of variable bleed valves to change the load capacity; a movement of a variable area nozzle.

5. A method to determine shaft stiffness in a steady state running condition; the method comprising steps to:
   a) determine inertia of the turbine according to claim 1;
   b) identify a local minimum frequency and square it;
   c) determine resonant frequency of the shaft and square it;
   d) determine frequency difference by subtracting the square of the local minimum frequency from the square of the resonant frequency; and
   e) determine shaft stiffness by multiplying the inertia of the turbine by the frequency difference.

6. A method to determine shaft stiffness at an initialisation condition; the method comprising steps to:
   a) determine shaft stiffness in the steady state running condition preceding initialisation according to claim 5;
   b) determine steady state resonant frequency in the steady state running condition preceding initialisation;
   c) determine initialisation resonant frequency in the initialisation condition;
   d) determine the ratio of resonant frequencies by dividing the square of the initialisation resonant frequency by the square of the steady state resonant frequency; and
   e) multiply the ratio of resonant frequencies by the steady state shaft stiffness to give the initialisation shaft stiffness.

7. A method to determine shaft torque comprising steps to:
   a) determine shaft stiffness according to claim 5;
   b) measure shaft twist angle; and
   c) multiply together the shaft stiffness and shaft twist angle to give shaft torque.

8. A method to control a gas turbine engine comprising steps to:
   a) determine shaft torque according to claim 7;
   b) determine actual shaft power by multiplying together shaft torque and rotational speed of the shaft;
   c) compare actual shaft power to demanded engine power to give a comparison value; and
   d) change fuel flow to the gas turbine engine if the comparison value is non-zero.

9. A method as claimed in claim 8 further comprising increasing fuel flow if the comparison value is less than zero or decreasing fuel flow if the comparison value is greater than zero.

10. A controller comprising the method as claimed in claim 1.

11. A gas turbine engine comprising in the method as claimed in claim 1.

12. A gas turbine engine comprising the controller as claimed in claim 10.

13. A gas turbine engine as claimed in claim 11 wherein the shaft is a low pressure shaft, an intermediate pressure shaft or a high pressure shaft.

14. A computer readable medium, having a computer program recorded thereon, wherein the computer program is adapted to make a computer execute the method according to claim 1.

15. A computer program having instructions adapted to carry out the method according to claim 1.

16. A computer program comprising the computer readable medium as claimed in claim 14.

* * * * *